INVENTOR.
KRIEGH G. CARNEY, JR.
BY
ATTORNEY

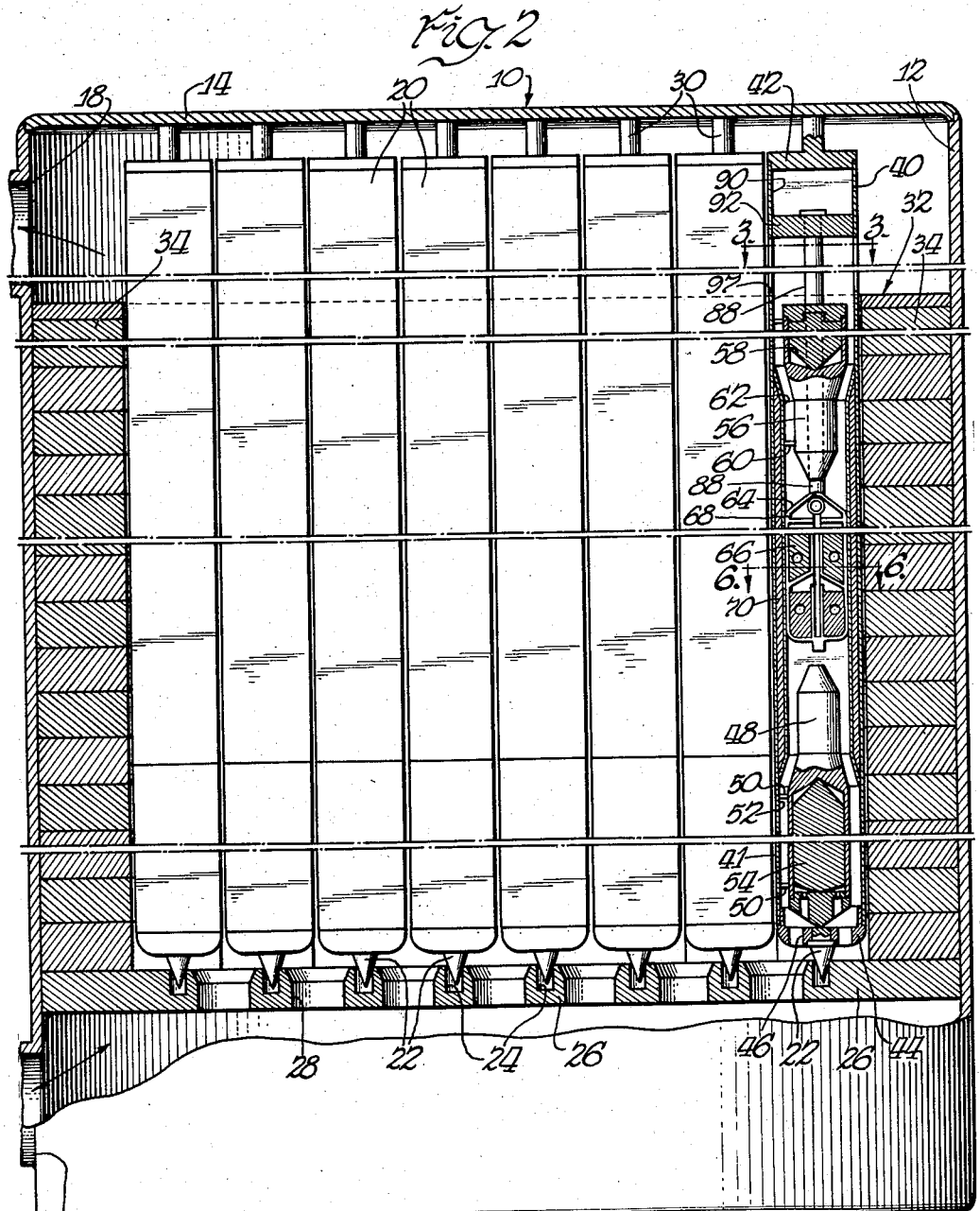

July 14, 1959 K. G. CARNEY, JR 2,894,893
FUEL ELEMENT FOR NUCLEAR REACTOR
Filed May 25, 1953 3 Sheets-Sheet 3
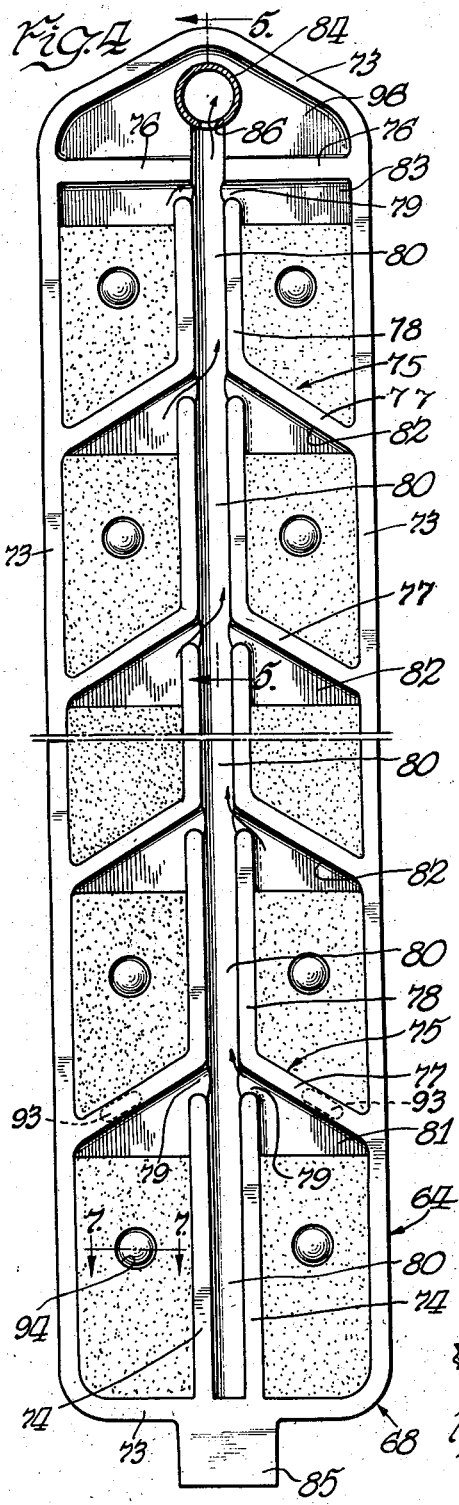
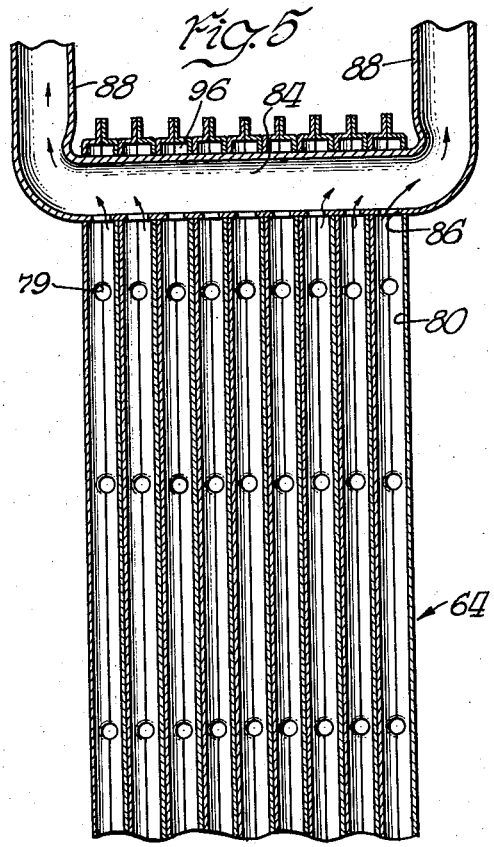
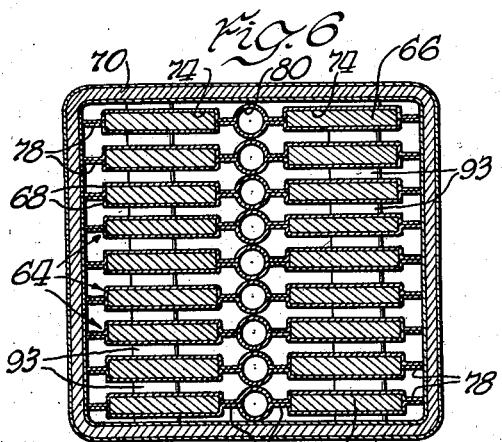
INVENTOR.
KRIEGH G. CARNEY, JR.
BY
ATTORNEY United States Patent Office 2,894,893
Patented July 14, 1959

2,894,893
FUEL ELEMENT FOR NUCLEAR REACTOR

Kriegh G. Carney, Jr., Scotia, N.Y., assignor to the United States of America as represented by the United States Atomic Energy Commission Application May 25, 1953, Serial No. 357,269

8 Claims. (Cl. 204—193.2)

This invention relates to a fuel element for a neutronic reactor.

It is important to construct a reactor so that the fuel elements thereof may be readily cooled, for the heat generated by fission is considerable. The fuel of fuel elements for nuclear reactors is a fissionable material, i.e., a material containing an isotope fissionable by neutrons of thermal energy, e.g., $U^{235}$, $U^{233}$, and $Pu^{239}$. Of course, reactors of intermediate and fast neutron energy types use these isotopes to obtain a self-sustaining chain reaction. Masses of uranium, for example, are difficult to cool because of the low conductivity of uranium. It is also important to jacket the uranium to keep fission fragments from migrating and thus disturbing reactor operation. Moreover, the uranium may be attacked by direct contact with a coolant.

An object of the present invention is to provide a fuel element for a neutronic reactor in which the fissionable material is divided into small masses for ease of cooling and these masses are held in separated and protected relation.

A further object is the provision of improved jackets for small masses of fissionable material which jackets are easy and cheap to manufacture and adequately hold the masses in proper relation in the reactor.

Other objects and advantages will appear to those skilled in the art upon a reading of the following specification together with the attached drawings, in which:

Fig. 2 is a vertical sectional view partly in elevation of the reactor, taken on the line 2—2 of Fig. 1;

Fig. 3 is an enlarged horizontal sectional view, taken on the line 3—3 of Fig. 2;

Fig. 4 is an enlarged elevational view of a portion of the interior of a fuel element;

Fig. 5 is a vertical sectional view, taken on the line 5—5 of Fig. 4;

Fig. 6 is an enlarged horizontal sectional view, taken on the line 6—6 of Fig. 2; and Fig. 7 is a horizontal sectional view, taken on the line 7—7 of Fig. 4.

Figure 1:
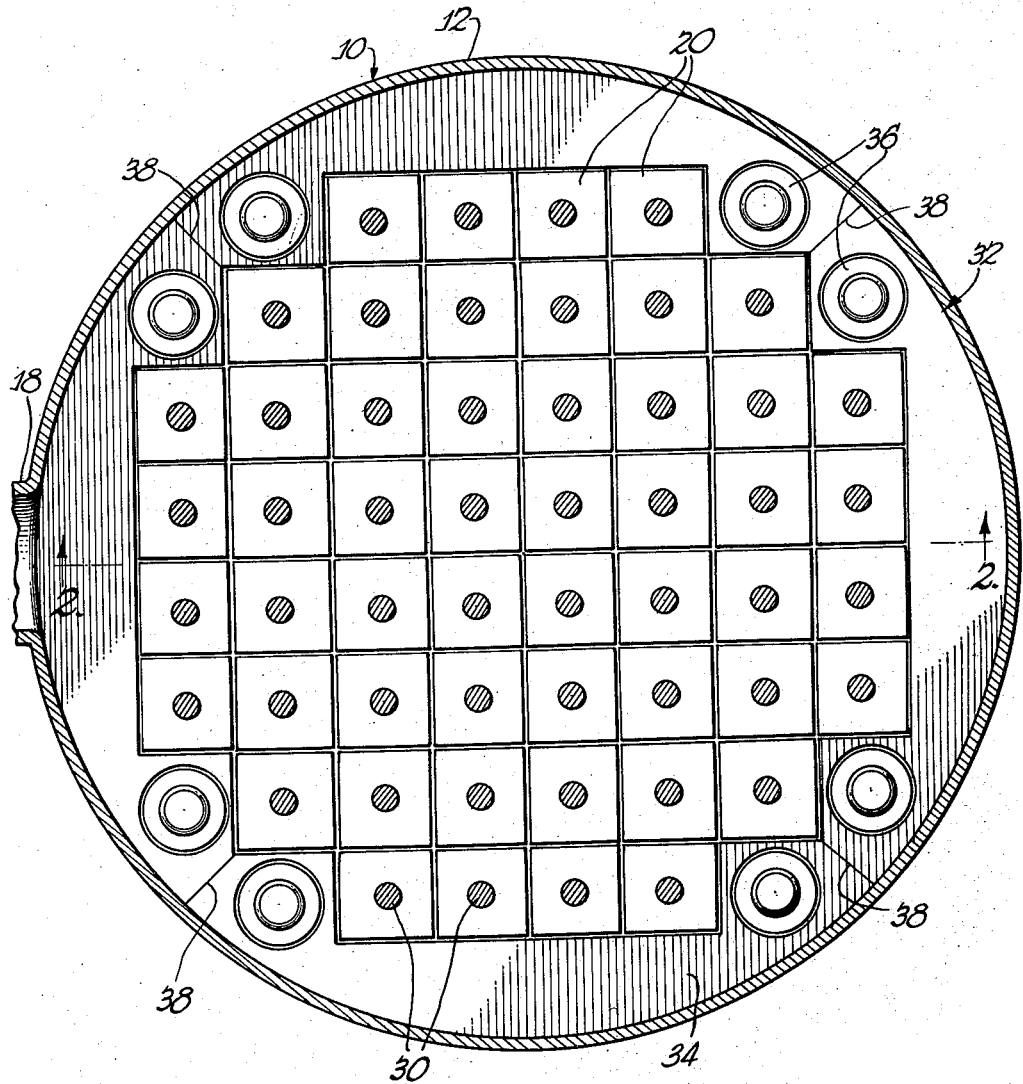
Fig. 1 is a plan view of a neutronic reactor, partly in section.

As shown in Figs. 1 and 2 a neutronic reactor is generally indicated at 10 which is contained within a cylindrical vessel 12 of nonfissionable material. Both ends of the vessel 12 are closed, the upper end being covered by a removable cover 14. A liquid coolant inlet 16 and an outlet 18 are provided near the lower and upper ends of the vessel 12, respectively. Disposed within the vessel 12 is a plurality of fuel elements 20 of rectangular or square shape which are assembled compactly as shown in Fig. 1. The assembly of the elements 20 comprises the so-called core of the reactor. At the lower end of each element 20 is a centering pin 22 (Fig. 2) that is seated in a hole 24 provided in a horizontal support plate 26 disposed across the lower end of the vessel 12 above the coolant inlet 16. In addition to the holes 24 the plate 26 is provided with a number of apertures 28 disposed among the holes. The apertures 28 serve as passages for a liquid coolant (not shown) as it circulates through the reactor 10 in a manner to be described below. At the top the fuel elements 20 are sustained in place by means of hangers 30 attached to the cover 14 in a suitable manner.

Surrounding the core formed by the fuel elements 20 is a reflector, generally indicated by 32, which is composed of a plurality of plates 34 of neutron-reflecting material, such as beryllium. The plates 34 are stacked upon the support plate 26 and snugly fit between the outer fuel elements 20 and the vessel 12 as shown in Figs. 1 and 2. At each corner of the core, two control rods 36 are situated within the reflector 32. The rods are cylindrical and extend vertically through the plates 34. These rods are rotatable and may be of the type disclosed and claimed in copending application of Kenneth A. Kesselring, Serial No. 279,004, filed March 28, 1952. As shown in Fig. 1 the plates 34 are divided into quarter segments at points 38 between each pair of rods 36.

In Fig. 2 one of the fuel elements 20 is broken away to show the disposition of the internal parts. The fuel element has square housings 40 and 41 of corrosion- and heat-resistant material such as stainless steel. The housing 40 is at the top and is closed in a fluid-tight manner by means of a cap 42 which is integral with the hanger 30. The housing 41 is at the bottom and is covered by a fitting 44 having a number of apertures 46 for the passage of the liquid coolant into the element 20. Above the fitting 44 is a body 48 of neutron-moderating material, such as beryllium, which is supported on the housing by a number of pins 50 extending from the inner surface of the housing and is spaced therefrom on all sides so that an annular passage 52 is formed between the body 48 and the housing 41. Liquid coolant is free to rise through this annular passage. Within the lower portion of the body 48 is contained a body 54 of neutron-breeding material such as natural uranium or thorium 232, or a body of any other material such as graphite for reflecting neutrons, or a material such as cobalt to form other isotopes by neutron absorption.

Near the upper end of the fuel element 20 is a similar body 56 of neutron-moderating material, such as beryllium, in the upper portion of which is disposed a body 58 of material similar to that of body 54. The body 56 is supported centrally within the housing 40 by means of a number of pins 60 in a manner similar to that in which the body 48 is supported, so that an annular passage 62 is formed between the body 56 and the housing 40.

Between the bodies 48 and 56 is disposed a plurality of casings 64 which are formed of nonfissionable corrosion-resistant material such as nickel and which house flat wafers 66 of fuel. The casings 64 are supported in position as shown within a square shell 70 of neutron-moderating material, such as beryllium, which extends over a greater portion of the fuel element 20 between the midpoints of the reflecting bodies 48 and 56. The housings 40 and 41 fit over reduced ends on the shell 70. For a better understanding of the casings 64 and their contents, reference is made to Figs. 4, 5, and 6.

Each casing 64 is composed of complementary halves 68 which may be fabricated into the form shown in Fig. 4 by subjecting generally rectangular elongated blank sheets of nickel to a die press, so as to have an offset peripheral flange 73, straight longitudinal ribs 74 extending from the flange 73 at one end, a plurality of compound ribs 75 extending from the flange 73 at the sides and transverse ribs 76 extending from the flange 73 near one end. The compound ribs 75 are arranged in pairs, one extending from one long side of the half 68, the other from the other long side. Each rib 75 comprises a portion 77 extending obliquely from the one long side and a longitudinal portion 78 extending parallel to the long side and to the portion 78 of the other rib 75 of the pair. The portions 78 of each pair of ribs 75 terminate short of the oblique portions 77 of an adjacent pair of ribs so that spaces 79 are formed. At one end of the casing half 68 the spaces 79 are formed between the transverse ribs 76 and the longitudinal portions 78 of the adjacent compound ribs 75. At the other end of the casing half the spaces 79 are formed between the longitudinal ribs 74 and the oblique portions 77 of the adjacent compound ribs 75. The longitudinal portions 78 of the various compound ribs 75 are aligned with one another and with the longitudinal ribs 74 and the regions of the casing half 68 between the portions 78 are pressed in a direction opposed to that in which the ribs 74 and the rib portions 75 protrude so that a longitudinal channel is produced which forms half of a tubular passageway 80. When two mating casing halves 68 are brought together, the complete passageway is formed.

The casing halves 68 of each pair are assembled and welded to one another along the flanges 73 and ribs 74, 75, and 76 so that chambers 81, 82, and 83 are formed for wafers 66 of fuel which are of fissionable material such as uranium enriched with $U^{235}$. There are two chambers 81 in opposed relation to one another, the chambers being formed by the flanges 73, the longitudinal ribs 74, and the oblique rib portions 77 adjacent the longitudinal ribs and having two sides parallel and two sides not parallel. There are a plurality of chambers 82 in opposed relation which are formed by the flanges 73, longitudinal rib portions 78, and oblique rib portions 77 and have the form of oblique parallelograms. There are two chambers 83 in opposed relation which are formed by the flanges 73, transverse ribs 76, and the adjacent longitudinal rib portions 78. The regions of the flanges 73 at the ends of the ribs 74 are formed as tails 85 which are welded to one another so that the end of the tubular passageway 80 is closed. The spaces 79 provide openings from the various chambers to passageway 80. A conduit 84 extends through all the casings 64 at the upper end of the passageways 80 and has openings 86 at these passageways. Portions 88 of the conduit 84 lead to a gas-collecting chamber 90, which is formed by the upper end of the housing 40, the cap 42, and a member 92 spaced from the cap within the housing. The channels of the various halves 68 engage one another to space the casings 64 from one another. These casings are also spaced by parts 93 which are lodged in and may be welded to the outer sides of the oblique portions 77 of the lowermost compound ribs 75. As shown in Fig. 7 the various wafers 66 have central openings 94 into which project protrusions 95 which are formed in the casing halves 68. Thus the wafers are held fixed in the various chambers 81, 82, and 83 of the casing halves 68 against undesired movement that might occur because of disintegration of the edges of the wafers 66 which support the wafers by engagement with the flanges 73 and the ribs 74 and 75 and because of the evolution of gases.

Fission gases evolved from the various wafers 66 during operation of the reactor rise to the tops of the various chambers 81, 82, and 83. From the chambers the fission gases go through the spaces 79 to the channels 80 and through them and the openings 86 to the conduit 84. This conduit leads them to the gas-collecting chamber 90. The chambers 81 and 82 have inclined upper regions formed by the oblique rib portions 77 which facilitate the collection of the fission gases at the spaces 79. The casings 64 and the conduit 84 are occupied by a relatively stagnant coolant that may be liquid sodium, in addition to the wafers 66. The stagnant coolant helps to conduct heat from the wafers to the walls of the casings. The stagnant coolant occupies not only the portions of the chambers 81, 82, and 83 not taken up by the wafers 66, but also a chamber 96 between the transverse ribs 76 and the portion of the flange 73 at the adjacent end of each casing half 68. The conduit 84 goes through the various casings 64 at their chambers 96 so that these chambers communicate with the interior of the conduit 84 through the openings 86 in this conduit.

A moving liquid coolant that may also be liquid sodium enters the reactor 10 via the inlet 16 and passes through the apertures 28 in the support plate 26 to rise to the top of the reactor through and between the fuel elements 20. Upon entering each fuel element through the apertures 46 at the lower end thereof, the coolant rises through the passage 52 between the housing 40 and the reflector body 48 to the casings 64. Because of the clearances between the casings 64, the coolant comes in intimate contact with the large surface area of the exterior of the casings 64, whereby an efficient heat exchange occurs between the fissionable wafers 66 and the coolant. As it continues to rise, the liquid passes through the passage 62 between the reflector body 56 and the housing 40 to a point near the top of the element 20 below the gas collection chamber 90. At this point the housing 40 is provided with oppositely disposed apertures 97 (Figs. 2 and 3) through which the coolant ultimately passes out of the element and the reactor 10 via the outlet 18.

It has been found that certain numerical limits are desirably observed in the reactor of the present invention. The number of fuel elements 20 may be 76, as is shown in Fig. 1. The reactor core shape is a modified octagonal 19 inches across flats and has a height of 18 inches. Uranium bodies used are enriched in $U^{235}$ and the $U^{235}$ content is about 93.5%. Desirable relative amounts of materials are as follows:

| | |
|---|---|
| Atomic ratio of beryllium moderator to $U^{235}$ | 48:1 |
| Volume of Ni _____percent__ | 7.52 |
| Atomic ratio of Ni to $U^{235}$ | 5.73:1 |
| Weight of external (flowing) coolant of sodium _ | ¹29 |
| Weight of internal (stagnant) coolant of sodium__ | ¹10 |

¹ Percent of reactor.

Reference is made to the copending application of Charles R. Stahl, Serial No. 321,076, filed November 18, 1952, for a showing and description of various types of reactors in which the fuel elements of the present invention can be used.

Since certain changes can be made in the foregoing device, it is intended that the above matter shown in the accompanying drawings and described hereinbefore shall be interpreted as illustrative only and may be modified without departing from the intended scope of the invention.

What is claimed is:

1. In combination, fuel members containing thermal-neutron-fissionable material, and a casing comprising elongated mating halves having ribs engaging one another so as to form chambers containing the fuel members, the ribs being compound and having portions oblique to the length of the halves so as to provide a slanting top for each chamber and longitudinal portions extending along the length of the halves so as to define a channel disposed between chambers on either side thereof, the ribs also having spaced openings between each chamber and the channel at a point adjacent the slanting top.

2. In combination, fuel members containing thermal-neutron-fissionable material, and a casing comprising elongated mating halves having compound ribs engaging one another so as to form chambers containing the fuel members, the ribs having longitudinal segments defining a channel between the chambers on either side thereof, the ribs also having oblique segments integral with the longitudinal segments and providing an inclined end for each chamber, the longitudinal segments of certain ribs and the oblique segments of adjacent ribs being spaced from one another so as to form openings between the chambers and channel adjacent the inclined ends of the chambers.

3. An assembly comprising a tubular housing of neutron-moderating material, a casing positioned within the housing so as to extend longitudinally and transversely thereof from one side to the other thereby to divide the space in the housing, the casing comprising mating halves elongated in the direction of the axis of the housing and having engaging ribs, the ribs having longitudinal segments defining a channel and chambers on at least one side thereof, the ribs also having integral oblique segments providing inclined ends between chambers, the longitudinal segments being spaced from one another to provide openings between each chamber and channel adjacent an inclined end, and a wafer of thermal-neutron-fissionable material within each chamber.

4. The assembly specified in claim 3 and further comprising a plurality of casings additional to said casing and like said casing, all the casings being parallel with one another and positioned within the tubular housing so as to extend longitudinally and transversely thereof from one side to the other thereby to divide the housing into a plurality of passages extending lengthwise thereof, and wafers of thermal-neutron-fissionable material positioned in the chambers of said additional casings.

5. The assembly specified in claim 4, the longitudinal segments of the ribs of each casing half being aligned in two spaced parallel lines to cause the channel defined by said longitudinal portions to lie between two aligned series of chambers, the portions of the casing halves being between the longitudinal rib segments projecting from the casing halves in opposed directions to said segments, whereby said portions of the various casings lie in contact with corresponding portions of adjacent casings and thus the casings are held in spaced relation at other regions.

6. The assembly specified in claim 5, certain ribs being hollow, and parts lodged in the hollow ribs to aid in maintaining the spacing of the casings.

7. The assembly specified in claim 3 and further comprising a plurality of casings additional to said casing and like said casing, all the casings being parallel with one another and positioned within the tubular housing so as to extend longitudinally and transversely thereof from one side to the other thereby to divide the housing into a plurality of passages extending lengthwise thereof, the channels formed by the casing halves being open at one end and closed at the other end, means forming a gas-collecting chamber within one end of the tubular housing, and wafers of thermal-neutron-fissionable material positioned in the chambers of said additional casings.

8. The assembly specified in claim 3 and further comprising a plurality of casings additional to said casing and like said casing, all the casings being parallel with one another and positioned within the tubular housing so as to extend longitudinally and transversely thereof from one side to the other thereby to divide the housing into a plurality of passages extending lengthwise thereof, the channels formed by the casing halves being open at one end and closed at the other end, means forming a gas-collecting chamber within one end of the tubular housing, wafers of thermal-neutron-fissionable material positioned in the chambers of said additional casings, and a body of neutron-moderating material between the casings and each end of the housing, each body having a blind bore in the end remote from the casings, and a body of neutron-absorbing material within each bore.

References Cited in the file of this patent

UNITED STATES PATENTS

| 754,131 | Forcke | Mar. 8, 1904 |
| 2,066,658 | Street | Jan. 5, 1937 |

FOREIGN PATENTS

| 861,390 | France | Oct. 28, 1940 |

OTHER REFERENCES

Ohlinger: Nucleonics, February 1950, page 58.